(No Model.)
O. HAMMOND, Jr.
CAN FOR ICE MAKING MACHINES.
No. 576,672. Patented Feb. 9, 1897.
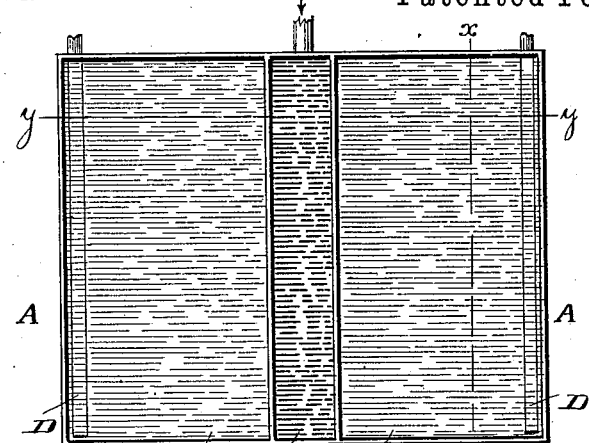
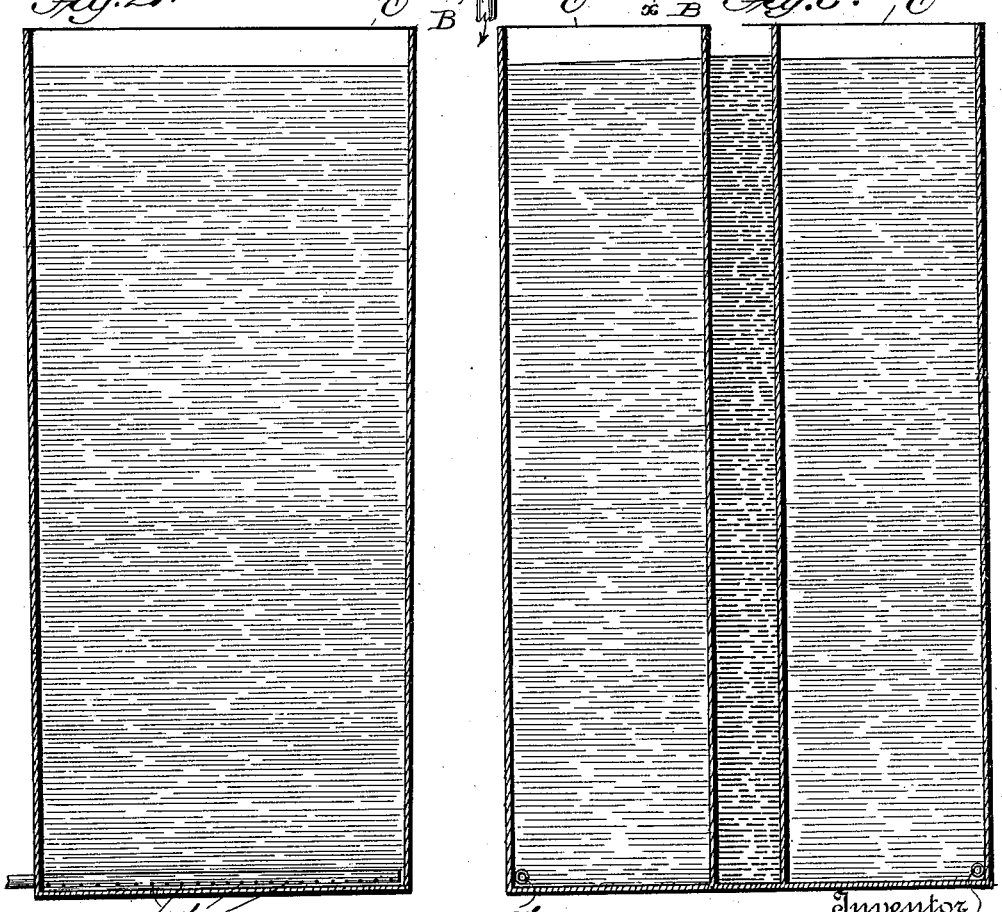

UNITED STATES PATENT OFFICE.

ORMOND HAMMOND, JR., OF BALTIMORE, MARYLAND.

CAN FOR ICE-MAKING MACHINES.

SPECIFICATION forming part of Letters Patent No. 576,672, dated February 9, 1897.

Application filed July 11, 1895. Serial No. 555,645. (No model.)

*To all whom it may concern:*

Be it known that I, ORMOND HAMMOND, Jr., of the city of Baltimore, State of Maryland, have invented a new and useful Improvement in Apparatus for Refrigerating Liquids, of which the following is a full description.

The accompanying drawings illustrate the invention, of which—

Figure 1 is a plan view of a double can for freezing ice, showing the air-pipe in the can; Fig. 2, a side sectional view of the same, taken on line $x\ x$, Fig. 1; Fig. 3, a front section of same, taken on line $y\ y$, Fig. 1.

During the process of freezing ice in cans it happens that bubbles of air or gaseous matter form on and adhere to the block of ice and remain there as the freezing progresses. These bubbles usually freeze up into the block and when they exist in quantities give an opaque or cloudy appearance to the ice. To prevent this, I force into the freezing liquid, at or near the bottom thereof, a current or currents of air, which rise to the top and in rising dislodge these bubbles, so that when the block is frozen it is clear and transparent.

A A are the walls of a double can selected for illustration, but a single can will work in the same way; B, the cooling liquid for freezing the water in the cans; C, the water to be frozen.

D is a pipe introduced near the bottom, closed at its inner end, and provided with the perforations $d'$. The other end of the pipe is connected with a suitable air-pump or other air-forcing apparatus (not shown in the drawings) for injecting the air into the pipe D and through the perforations. As the air thus forced in rises to the top it dislodges the bubbles which have adhered to the ice block and all pass together up through the water and out at the top, leaving the ice block clear of bubbles, and when frozen will not have the opaque appearance shown when the bubbles are frozen into the block.

By reference to Fig. 2 of the drawings it will be seen that the air-pipe D is perforated throughout its length within the tank and that these perforations $d'$ are on the lower side below its center. The purpose of this location of the perforations is to deliver the air against the bottom of the freezing-can at an angle. The pipe D is located against the wall of the can opposite to the freezing-wall. Hence the stream of air as it is projected from the perforations of the pipe D will strike the bottom of the can and by it be deflected in the direction of the bottom of the freezing block. The bubbles of air and included gases in the water either remain in a state of equilibrium or are driven out of the water as the block freezes, and it is desirable that as they form on the surface of the freezing block they should be taken up by the rising bubbles of air and carried out to the surface of the can. Hence the air is admitted at the bottom of the can through a number of small perforations in a pipe, which perforations cause a number of streams of air to flow from the pipe toward the bottom of the freezing block. If these streams of air be allowed to impinge directly upon the freezing block, they will, so to speak, cut holes in it by causing an undue circulation of water at the points at which they strike the block. It is therefore desirable that their force and direction should be somewhat broken while still maintaining their general direction. Therefore I have found that the best result is accomplished by inclining the air-delivery passages $d'$ downward in such a manner as to cause the air to strike the bottom of the can a short distance away from the pipe and then rise against the surface of the freezing block.

By the construction shown in the foregoing specification it will be seen that the block is frozen from one side of the can only, and this is equally true in case of a double can wherein two blocks of ice are frozen, as each of them is frozen from only one side, and the process of freezing is stopped before the two blocks close in the case of a double can, or in the case of a single can the process is stopped before the block closes against the other side of the can.

What I claim, and desire to secure by Letters Patent, is—

In a can for freezing and clarifying ice in blocks, provided with means for applying a heat-absorbent to one side of the can only, in combination with an air-supply pipe located at the bottom of the can and at a point near the side opposite to that of the heat-absorbent, said pipe provided with delivery-apertures arranged to direct the air against the bottom of the can, and deflect the same before contacting with the side of the freezing block, whereby the ice is frozen in a solid block and clarified.

Signed at Baltimore city, State of Maryland, this 10th day of July, A. D. 1895.

ORMOND HAMMOND, Jr.

Witnesses:
CHAS. REUTER,
JOHN L. HEBB.